Dec. 6, 1932.   C. KRAUCH ET AL   1,890,436
CONVERSION OF SOLID FUELS AND PRODUCTS DERIVED THEREFROM
OR OTHER MATERIALS INTO VALUABLE LIQUIDS
Original Filed Feb. 6, 1926.
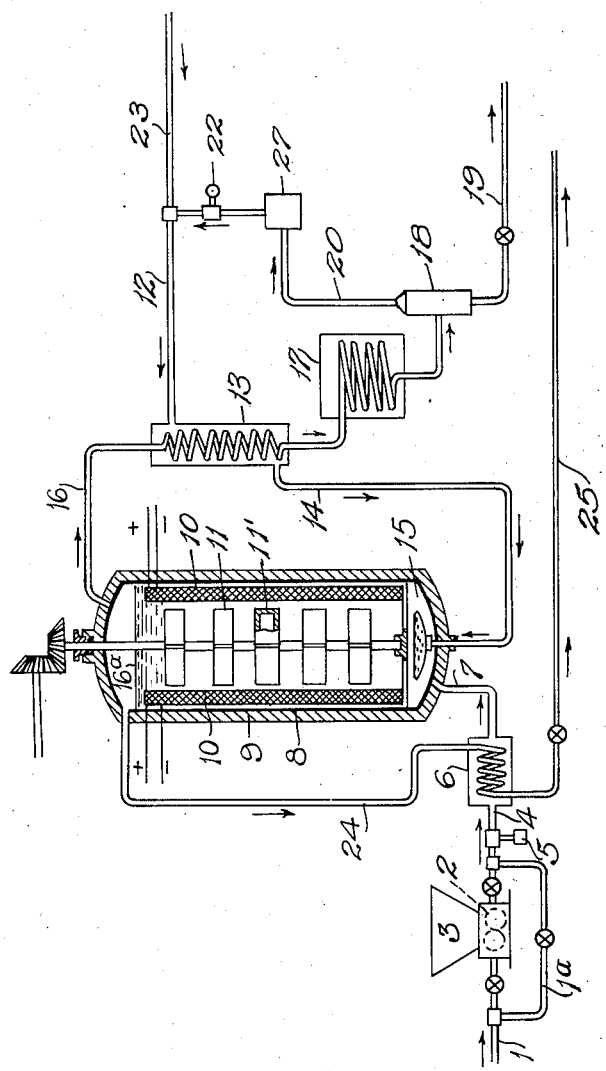
Inventors
CARL KRAUCH
MATHIAS PIER.
By
Attorneys.

Patented Dec. 6, 1932

1,890,436

UNITED STATES PATENT OFFICE

CARL KRAUCH, OF LUDWIGSHAFEN-ON-THE-RHINE, AND MATHIAS PIER, OF HEIDELBERG, GERMANY, ASSIGNORS, BY MESNE ASSIGNMENTS, TO STANDARD-I. G. COMPANY, OF LINDEN, NEW JERSEY, A CORPORATION OF DELAWARE

CONVERSION OF SOLID FUELS AND PRODUCTS DERIVED THEREFROM OR OTHER MATERIALS INTO VALUABLE LIQUIDS

Original application filed February 6, 1926, Serial No. 86,646, and in Germany February 16, 1925. Divided and this application filed April 7, 1927. Serial No. 181,883.

One of the most important and widely agitated problems in the industrial world has for a long time been how to produce good gasoline or other valuable liquid fuels from solid fuel including coal in all its varieties and wood, and products of distillation or mineral oils especially heavy oils.

One attempt at the solution of this problem has been made by the so-called liquefaction of coals by means of hydrogen or by destructive hydrogenation of tars or oils at a high pressure and high temperature but this has not reached application industrially because of an unsatisfactory speed and rate of the conversion.

By the process described in the specification of the original application No. 86,646 filed February 6th, 1926, of which this is a division, we claim to have successfully solved this problem for the first time and to be able to produce good pure liquid fuels, including also benzines from solid fuels and to convert also tars obtained from solid fuels and also heavy mineral oils, or crude oils, or residues into more valuable liquid products, including benzines, by a process economical in material, time, labour and wear of the apparatus.

In arriving at this result we have made several discoveries or inventions to certain of which this application is directed.

We have found that among the many possible applications or modifications of the process in accordance with our parent application Ser. No. 86,646, particularly excellent results are obtained by the treatment of liquid fuels, namely distillation products of coal, lignite and other solid fuels, whether ordinary or primary (from low temperature carbonization) or other tars or crude mineral oils and their fractions or products obtained from these by various industrial treatments, all of which products we comprise by the term "crude liquid hydrocarbons," with hydrogen in the presence of a catalyst containing a metal of the sixth group of the periodic system (whether as such or in a combined condition) give particularly valuable results. By the term "metals of the sixth group of the periodic system" we mean molybdenum, tungsten, chromium and uranium. We have found that such catalysts are not poisoned by the sulfur compounds and other impurities contained in said materials and are highly efficient for a very great length of time. The treatment with hydrogen is best carried out under a pressure of about 50 or more atmospheres and most advantageously the material to be treated is vaporized or sprayed or otherwise finely divided and carried with hydrogen over the said catalyst containing any of the said metals, or an oxid or other compound thereof under a pressure of a suitable range, and at an elevated temperature sufficient for promoting the reaction, generally ranging between about 300 and 700° C.

By the said treatment, the original material is split up into smaller molecules which partly may recombine to form products of a higher order or at least the sulfur compounds contained therein are destroyed with an evolution of gaseous sulfur compounds, and at the same time oxygen compounds and unsaturated bodies contained therein or formed by the splitting process are reduced and hydrogenated, the whole of which transformations we designate a "destructive hydrogenation".

In order to avoid an attack of the apparatus by sulfur or other influences, which is a serious difficulty in the practical performance of the process, we have found it excellently suitable to compose or line the apparatus where it comes into contact with hot gaseous, liquid or solid carbonaceous material, of aluminium or its alloys which metals may be used until near their melting point. Also chromium and its alloys prove very resistant to corrosion in the course of the operation and withstand also all temperatures which may come into question. Especially chromium itself, chiefly as a lining or coating, or alloys containing more than 10 per cent of chromium and not more than 0.2 per cent, preferably less than 0.1 per cent of carbon, are very suitable. At the same time a content of nickel amounting to 40 per cent is not attacked even if in use for a very long time.

When employing distillation products of solid carbonaceous bodies as a starting material, the destructive hydrogenation treatment may directly follow the distillation process without an intermediate condensation of the tar vapors and the distillation may also take place under elevated pressure and, if desired, in the presence of hydrogen and catalysts.

Suitable catalysts immune from poisoning by sulphur for the present process may contain for example, molybdenum or its compounds, such as sulfids, or molybdic acid, or molybdates of ammonium or other bases, or other metals of the aforesaid group or their compounds, and other substances, immune from poisoning by sulphur, whether possessing hydrogenating properties, or not, may be admixed thereto. For example, cobalt or iron, or compounds thereof, or alumina, zinc oxid, magnesia, or calcium carbonate, may be cited as admixtures. Supports, for example, lumps of clay may also be used.

The preferred form of carrying out the process is generally a continuous operation with a stream of the gases and the materials finely divided therein, and with an excess of hydrogen over the required quantity and preferably while maintaining the desired pressure by adding fresh gas and passing the gas either by circulation through one or more reaction vessels, or through a succession of reaction vessels, without circulation. The products are separated from the reaction gases by cooling or absorbing with a wash oil or solid adsorbents or in any suitable manner.

The gases serving for the reaction may consist of hydrogen alone or of mixtures containing hydrogen, for example a mixture of hydrogen and nitrogen, or water gas, or hydrogen mixed with carbon dioxid, hydrogen sulfid, water vapor, or methane or other hydrocarbons. Or the hydrogen may be generated in the reaction chamber by the interaction of water and carbon monoxide or the like; or by decomposing the gaseous hydrocarbons formed during the treatment, and to be found in the reaction gases, by burning with a restricted quantity of oxygen so as to combine substantially with the carbon to form carbon monoxide and liberate hydrogen. Or the gaseous hydrocarbons may be decomposed with steam at a high temperature or with mixtures of water vapor and oxygen. Catalysts may be employed for facilitating said decomposition, for example, nickel coated magnesia or other solid bodies, a melt of iron or iron alloys or other catalysts for the reaction. The decomposition may take place either at ordinary pressure or, when oxygen is employed, under a pressure identical with that prevailing in the destructive hydrogenation in order to save compression energy. All the said gases consisting of, or containing hydrogen are understood to be comprised by the term "hydrogen" wherever this is employed in the present application.

Depending on the conditions of working, for example temperature and pressure employed, or duration of the treatment, the products are poor or rich in liquid hydrocarbons of low boiling point. Generally the reaction temperature ranges between 300 and 700° C. and the pressure may amount to 20, 50, 200 or still more atmospheres.

The liquid hydrocarbons obtained are generally very low in sulfur or free therefrom, and are excellently suitable for use as fuel for internal combustion engines, or as lubricating oils, inasmuch as they are products of a higher boiling point. The low boiling fractions may be mixed with other fuels, for example, benzines or ordinary gasoline, benzol, or low alcohols of the aliphatic series and possess the remarkable property of being miscible to a large degree with the latter, particularly with methanol. A mixture containing 60 per cent of a hydrocarbon obtained from crude oil in accordance with the described process, 30 per cent of gasoline and 10 per cent of methanol may be cited as an example. The products are also excellent solvents for a great variety of bodies.

In the accompanying drawing, an apparatus for carrying out the process according to the present invention is illustrated diagrammatically, partly in vertical section. Our invention is not limited to the apparatus illustrated therein, however, but may be varied at will in accordance with the conditions of working.

Referring to the drawing in detail, reference numeral 1 indicates a feed line from any convenient source of liquid raw material. The line 1 discharges to a grinding mechanism 2 fitted with a hopper 3 through which solid materials may be admitted, if desired. The grinding mechanism can be by-passed by line 1a when no solid materials are used. The liquid may be then forced by pump 5 through a line 4 to a heat exchanger 6 and thence by line 7 into a reaction chamber 8. The reaction chamber is constructed in any preferred manner and should be adapted to withstand high pressures, for example; above 20–100 or even as high as 800 atmospheres, as well as the corrosive effects of the reactants. The vessel is preferably protected from loss of heat by a suitable insulating cover 9 and may be heated by electric coils 10 which are arranged within the drum. The contents of the drum are preferably kept in a state of agitation by means of a stirring mechanism 11 and, if desired, suitable catalytic materials 11' as indicated above may be attached to the stirring mechanism so that the catalyst is brought into intimate contact with the contents of the vessel.

Hydrogen under high pressure is forced through a line 12, heat exchanger 13 and then by line 14 into the base of the reactor 8 into which it is preferably discharged through a spray pipe 15. A liquid level may be maintained in the drum, for example at the point 16a and gas and vaporous products may be continuously withdrawn by vapor line 16 which is in communication with exchanger 13 and a cooling coil or condenser 17. The condensate and gas is discharged into a separation drum 18 from which the distillate is removed by line 19 to storage, not shown. The gas may be taken off by a pipe 20 to a repurifying system indicated at 21, and which may comprise a scrubbing system preferably carried out at high pressure using, for example, soda to remove hydrogen sulfide and oil to remove hydrocarbon constituents from the gas. Purified gas is then recompressed by a booster pump 22 and is forced again into the hydrogen feed line 12. Fresh hydrogen may be introduced by line 23. If desired, oil may be continuously removed from the drum by a line 24 which communicates with heat exchanger 6 and which is withdrawn to storage, not shown, by a suitable line 25.

If it is intended to carry out the destructive hydrogenation according to the present invention in the vaporous phase the apparatus shown in the accompanying drawing needs only little modification. Thus the hopper 3 may be dispensed with, and the initial liquid or vaporous hydrocarbon to be converted is introduced at 1. Similarly lines 24 and 25 as well as the heat exchanger 6 may be dispensed with. Between pump 5 and the entrance of line 7 into the reaction chamber 8 a preheater is inserted in which the materials supplied at 1 are brought to the desired temperature and, if liquid, also vaporized. This preheater may for example consist of a coil capable of being heated by combustion gases. In case of working in the vapor phase no stirring mechanism is needed. The catalysts, therefore, may be employed in the form of solid pieces of any shape and of a suitable size, for example, that of hazel nuts filled into the reaction space.

In the following examples the time of reaction varies considerably, as might be supposed, depending on the nature of the raw material, the activity of the catalyst, temperature, pressure and the like. In practice it is desirable to make a few preliminary runs in order to determine the time required for the best yields under a given set of conditions. Generally speaking, with batch operations the total time may be from two to ten hours or more, depending on the yield desired, while with continuous operations the time is usually shorter. When continually feeding liquid or difficultly vaporizable oils, the rate of flow may be in the neighborhood of .3 to .8 volumes of oil per hour per volume of reaction space. Vaporous materials may be treated at higher temperatures and the feed rate may consequently be one or even one and one-half volumes per hour per volume of reaction space. The volume of hydrogen may likewise vary considerably and should always, of course, be in excess of that actually required for the conversion; for example, the rate of flow of hydrogen may be in excess of about 600 litres per kilogram of carbonaceous material.

The following examples will serve to further explain how our invention is carried out in practice, but our invention is not restricted to these examples.

*Example 1*

Brown coal tar obtained in a gas producer fed with brown coal, is vaporized at a temperature of 500 degrees centigrade and under a pressure of about 150 atmospheres, in a current of hydrogen, and the mixture is continuously passed over a contact mass consisting of a mixture of molybdic acid with an addition of 20 per cent its weight of aluminium hydroxid. The gas is pumped round in a circular way while maintaining the pressure by an addition of fresh hydrogen, and separating the material by cooling. There is formed a thin and nearly colorless product free from phenols, without any formation of coke, asphalt or other residue. From thirty to fifty per cent of the product distil up to 150° C., and the fractions up to 300° C. are colorless and fully saturated. At 350 degrees C. only a small residue is left having a vaseline-like nature. The raw product can be used as a motor fuel or for manufacturing lubricating oils. An addition of say 1 per cent of ammonia to the hydrogen is also useful.

A mixture consisting of 75 per cent, by volume, of hydrogen and 25 per cent of nitrogen may also be used, preferably at a pressure of 200 atmospheres.

Molybdic acid alone or molybdenum sulfid or other masses containing molybdenum may also be employed, also coal tar, and components such as raw cresylic acid.

*Example 2*

Raw cresylic acid obtained from coal tar is passed along with a current of hydrogen over tungstic acid under a pressure of 20 atmospheres and at a temperature of about 500° to 550° C. whereby it is rapidly and completely converted into hydrocarbons.

*Example 3*

Petroleum residues when treated as described in the foregoing example yield in a continuous manner and without any formation of coke or asphalt, at between 450° and 500° C., a product containing from 50 to 80 per cent of benzine boiling up to 150°.

Example 4

Brown coal tar obtained in a gas producer is continually passed, along with a mixture of 3 parts of hydrogen with one part (by volume) of nitrogen at about 500° C. and under 200 atmospheres over a contact mass consisting of chromium hydroxid. The tar is hereby converted into a thin oil, practically free from phenol and of a saturated nature and containing about 50 per cent of benzine (boiling up to 150° C.). The fractions of higher boiling point are free from asphalt and can be converted into benzine by a repeated treatment.

Example 5

Dark-colored residues of an American rock oil which at ordinary temperature are nearly solid and have a strongly unsaturated character are incorporated into an excess of a gas mixture composed of three parts, by volume, of hydrogen and 1 part of nitrogen and continuously passed under a pressure of 200 atmospheres and a temperature of from 450° to 500° C. over a contact mass prepared from an intimate mixture of 70 parts, by weight, of ammonium molybdate and 30 parts of aluminium hyroxid. A nearly colorless, thin and saturated product is obtained besides a little methane, consisting of 90 per cent of colorless gasoline boiling up to 150° and 10 per cent of a thin, yellowish product of a higher boiling point.

Example 6

Jura shale oil of 0.950 sp. gr. containing 4 per cent of sulfur which on distilling yields 6 per cent petrol up to 150° and 21 per cent of a pitch-like residue over 350° C. is treated as described in the foregoing example. The product is a thin yellowish oil of 0.810 sp. gr. containing 80 per cent of saturated gasoline boiling up to 150° and leaving at 200° C. a liquid weakly colored residue.

Example 7

Mexican asphalt is dissolved in its own weight of cyclohexane and treated in the aforedescribed manner. The cyclohexane is recovered unaltered, while the asphalt which before the treatment contained 4 per cent compounds boiling up to 250° C., 25 per cent more boiling up to 350° C. and 70 per cent of a hard pitch residue, is converted into a thin oil, free from oxygen compounds and chiefly consisting of gasoline hydrocarbons besides a very small vaseline-like residue.

Rock oils of any origin may be treated as described in the above examples and thereby converted into refined products of much more valuable properties.

Example 8

Vaporized brown coal tar is incorporated with a gas mixture composed of 10 per cent, by volume, of carbon monoxid and 90 per cent of hydrogen and brought under a pressure of 200 atmospheres, and the mixture is passed at about 450° C. over a contact mass prepared from 9 parts of zinc oxid and 1 part of chromic acid. On cooling, a product is condensed which contains some methanol and oxygen compounds of a higher order, about 30 per cent of benzine and products of a higher boiling point which may serve for a conversion into lubricating oils or for a repeated treatment as aforementioned. The mixture of hydrogen and carbon monoxid is circulated while replacing the consumed gases.

In all of the above examples the hot parts of the apparatus may be lined or coated with aluminium or aluminium alloys or chromium or made of or coated with an alloy of 60 per cent of nickel, 27.7 per cent of iron, 12 per cent of chromium and 0.3 per cent of carbon; or an alloy composed of 58 per cent of nickel, 25 per cent of iron, 17 per cent of chromium and 0.03 per cent of carbon; or an alloy composed of 96 per cent of iron, 1.75 per cent of nickel, 1.5 per cent of chromium, 0.1 per cent of carbon and also of 0.25 per cent of silicon, 0.27 per cent of manganese, besides small quantities of copper, sulfur and phosphorus.

Our invention is not confined to the above examples; the conditions may be widely varied in various directions. For example the pressures and temperatures may be higher or lower than stated above.

In the appended claims, the expression "liquid distillation products of solid fuels" is intended to relate only to normally liquid distillation products and is not to be construed to include normally gaseous products of the distillation of solid and liquid fuels.

Likewise when the expression "containing a metal of the sixth group" is used, it is intended to mean such metals in the free and in the combined state.

Also when the expression "added catalyst" is used in said claims, it is not necessarily intended to mean that a catalyst is introduced into the reaction chamber with each charge of carbonaceous material, but is merely intended to indicate that the reaction is carried out in the presence of an effective quantity of a catalytic material which is not naturally contained in the carbonaceous material undergoing treatment or is contained in said carbonaceous material in ineffective quantities.

What we claim is:

1. The process of converting crude liquid hydrocarbons into a liquid rich in hydrocarbons of low boiling point of benzine character which comprises distributing the crude liquid hydrocarbons in a stream of hydrogen in excess of the required quantity and exposing the mixture to heat at a temperature ranging between about 300° and 700° centigrade and a pressure upwards of 100 atmospheres, in the presence of an added catalyst immune to sulfur poisoning.

2. The process of converting crude liquid hydrocarbons into a liquid rich in hydrocarbons of low boiling point of benzine character which comprises distributing the crude liquid hydrocarbons in a stream of hydrogen in excess of the required quantity and exposing the mixture to heat at a temperature ranging between about 300° and 700° centigrade and a pressure upwards of 100 atmospheres, in the presence of a catalyst comprising a metal of the sixth group of periodic system.

3. The process of converting crude liquid hydrocarbons into a liquid rich in hydrocarbons of low boiling point of benzine character which comprises distributing the crude liquid hydrocarbons in a stream of hydrogen in excess of the required quantity and exposing the mixture to heat at a temperature ranging between about 300° and 700° centigrade and a pressure upwards of 100 atmospheres, in the presence of a catalyst comprising molybdenum.

4. The process of converting liquid distillation products of solid fuels into more valuable liquid hydrocarbons which comprises distilling a solid fuel in the presence of an introduced stream of added hydrogen and subjecting the evolved vapours to a treatment with hydrogen in excess of the required quantity and heat at a temperature ranging between about 300° and 700° centigrade and pressure of at least 20 atmospheres in the presence of a catalyst comprising a metal of the sixth group of the periodic system.

5. The process of converting crude liquid hydrocarbons into valuable liquid hydrocarbons which comprises destructively hydrogenating them with added hydrogen and heat at a temperature ranging between about 300° and 700° centigrade in the presence of an added catalyst immune to sulfur poisoning at a pressure of at least 20 atmospheres.

6. The process of converting liquid distillation products obtained from solid fuels into more valuable liquid hydrocarbons which comprises destructively hydrogenating them with added hydrogen and a catalyst comprising molybdenum and heat at a temperature ranging between about 300° and 700° centigrade at an elevated pressure of at least 20 atmospheres.

7. The process of converting liquid distillation products obtained from solid fuels into more valuable liquid hydrocarbons which comprises destructively hydrogenating them with added hydrogen and a catalyst containing a metal of the sixth group of the periodic system and a substance selected from the group consisting of alumina, zinc oxide, magnesia and calcium carbonate and heat at a temperature ranging between about 300° and 700° centigrade at an elevated pressure of at least 20 atmospheres.

8. The process of destructively hydrogenizing crude liquid hydrocarbons which comprises treating them with added hydrogen in the presence of an added solid catalyst immune to sulfur poisoning and heat at a temperature above 300° C. and at a pressure of at least 20 atmospheres, the conditions of working such as temperature, pressure and the efficiency of the catalyst, being so adapted to each other as to give rise to the formation of substantial amounts of low boiling hydrocarbons of a benzine character.

9. The process of converting crude liquid hydrocarbons into more valuable liquids which comprises destructively hydrogenating them with added hydrogen in the presence of an added solid catalyst immune to sulfur poisoning and heat at a temperature of between about 300° and 700° C. and at a pressure upwards of 100 atmospheres.

10. The process of converting crude liquid hydrocarbons into more valuable liquids which comprises destructively hydrogenating them with a stream of added hydrogen and an added catalyst immune to sulfur poisoning and heat at a temperature of between about 300° and 700° C. and at an elevated pressure of at least 20 atmospheres.

11. The process of converting crude liquid hydrocarbons into more valuable liquids which comprises destructively hydrogenating them with added hydrogen and a catalyst comprising a metal of the sixth group of the periodic system and heat at a temperature of between about 300° and 700° C. and at a pressure of at least 20 atmospheres.

12. The process of converting crude liquid hydrocarbons into more valuable liquids which comprises destructively hydrogenating them with added hydrogen and a catalyst containing molybdenum at a temperature upwards of 350° C.

13. The process of destructively hydrogenizing crude liquid hydrocarbons containing asphalt which comprises treating them with added hydrogen in the presence of an added solid catalyst immune to sulphur poisoning, at a temperature above 300° C. and at a pressure of at least 20 atmospheres for a period such that, under the conditions as above given, the product is substantially free from asphalt.

14. The process of converting crude liquid hydrocarbons into valuable liquid hydrocarbons which comprises destructively hydrogenating them with added hydrogen at a temperature ranging between about 300° and 700° centigrade in the presence of an added catalyst comprising an oxide of a metal of group six of the periodic system and under a pressure of at least 20 atmospheres.

15. The process of converting crude liquid hydrocarbons into valuable liquid hydrocarbons which comprises destructively hydrogenating them with added hydrogen at a temperature ranging between about 300° and 700° centigrade in the presence of an added catalyst comprising an oxide of molybdenum and under a pressure of at least 20 atmospheres.

16. The process of converting liquid distillation products obtained from solid fuels into more valuable liquid hydrocarbons which comprises destructively hydrogenating them with added hydrogen and a catalyst comprising a metal of the sixth group of the periodic system and a metal selected from the group consisting of cobalt and iron and heat at a temperature ranging between about 300 and 700° C. at an elevated pressure of at least 20 atmospheres.

17. The process of converting crude liquid hydrocarbons into more valuable liquids which comprises destructively hydrogenating them with added hydrogen in the presence of a catalyst comprising a compound of a metal of the sixth group of the periodic system at a temperature between about 300° and 700° C. and under a pressure of at least 50 atmospheres.

18. The process of converting crude liquid hydrocarbons into more valuable liquids which comprises destructively hydrogenating them with added hydrogen in the presence of a catalyst comprising chromium at a temperature between about 300° and 700° C. and under a pressure of at least 50 atmospheres.

19. The process of converting crude liquid hydrocarbons into more valuable liquids which comprises destructively hydrogenating them with added hydrogen in the presence of a catalyst comprising a compound of chromium at a temperature between about 300° and 700° C. and under a pressure of at least 50 atmospheres.

20. The process of converting crude liquid hydrocarbons into more valuable liquids which comprises destructively hydrogenating them with added hydrogen in the presence of a catalyst comprising an oxide of chromium at a temperature between about 300° and 700° C. and under a pressure of at least 50 atmospheres.

21. The process of converting crude liquid hydrocarbons into more valuable liquids which comprises destructively hydrogenating them with added hydrogen in the presence of a catalyst comprising tungsten at a temperature between about 300° and 700° C. and under a pressure of at least 50 atmospheres.

22. The process of converting crude liquid hydrocarbons into more valuable liquids which comprises destructively hydrogenating them with added hydrogen in the presence of a catalyst comprising a compound of tungsten at a temperature between about 300° and 700° C. and under a pressure of at least 50 atmospheres.

23. The process of converting crude liquid hydrocarbons into more valuable liquids which comprises destructively hydrogenating them with added hydrogen in the presence of a catalyst comprising an oxide of tungsten at a temperature between about 300° and 700° C. and under a pressure of at least 50 atmospheres.

24. The process of converting crude liquid hydrocarbons into more valuable liquids which comprises destructively hydrogenating them with added hydrogen in the presence of a catalyst comprising a compound of molybdenum at a temperature between about 300° and 700° C. and under a pressure of at least 50 atmospheres.

In testimony whereof we have hereunto set our hands.

CARL KRAUCH.
MATHIAS PIER.